United States Patent
Campbell et al.

(10) Patent No.: US 8,081,291 B2
(45) Date of Patent: Dec. 20, 2011

(54) ELECTRO-OPTIC ZOOM LENS SYSTEM

(75) Inventors: Scott P. Campbell, Thousand Oaks, CA (US); Bing Wen, Camarillo, CA (US); Milind Mahajan, Thousand Oaks, CA (US); Bruce K. Winker, Ventura, CA (US); Donald B. Taber, Newbury Park, CA (US)

(73) Assignee: Teledyne Licensing, LLC, Thousands Oaks, CA (US)

( * ) Notice: Subject to any disclaimer, the term of this patent is extended or adjusted under 35 U.S.C. 154(b) by 1150 days.

(21) Appl. No.: 11/653,000

(22) Filed: Jan. 12, 2007

(65) Prior Publication Data
US 2007/0159701 A1    Jul. 12, 2007

Related U.S. Application Data

(60) Provisional application No. 60/758,911, filed on Jan. 12, 2006, provisional application No. 60/830,541, filed on Jul. 12, 2006.

(51) Int. Cl.
*G02F 1/13* (2006.01)

(52) U.S. Cl. .............................. 349/200; 359/676; 349/62

(58) Field of Classification Search ........................ None
See application file for complete search history.

(56) References Cited

U.S. PATENT DOCUMENTS

| | | | |
|---|---|---|---|
| 4,995,705 A * | 2/1991 | Yoshinaga et al. | 349/22 |
| 5,052,791 A | 10/1991 | Kikuchi | 999/559 |
| 5,140,151 A | 8/1992 | Weiner et al. | |
| 5,565,933 A * | 10/1996 | Reinsch | 348/742 |
| 5,793,528 A | 8/1998 | Wallace et al. | |
| 6,061,945 A | 5/2000 | Wallace et al. | |
| 6,111,840 A * | 8/2000 | Hajjar | 369/112.02 |
| 6,295,170 B1 | 9/2001 | Wallace et al. | |
| 6,437,925 B1 | 8/2002 | Nishioka et al. | 359/726 |
| 6,476,919 B1 * | 11/2002 | Mori et al. | 356/479 |
| 6,549,282 B1 * | 4/2003 | Johs et al. | 356/369 |
| 6,888,590 B1 | 5/2005 | Nishioka et al. | 359/56 |
| RE40,414 E * | 7/2008 | Takahashi et al. | 369/112.02 |
| 2006/0056044 A1 * | 3/2006 | Iwasawa | 359/676 |
| 2006/0262255 A1 * | 11/2006 | Wang et al. | 349/114 |

OTHER PUBLICATIONS

Machine translation of JP 06-273677.*

* cited by examiner

*Primary Examiner* — Lucy Chien
(74) *Attorney, Agent, or Firm* — Koppel, Patrick, Heybl & Philpott

(57) ABSTRACT

A fast, electro-optically switched zoom lens system operates across a broad spectral and thermal range while correcting for birefringent aberrations by means of a polarizing system that preferably includes polarizing reticles.

17 Claims, 6 Drawing Sheets

ELECTRO-OPTIC ZOOM LENS SYSTEM

This application claims the benefit of provisional patent application No. 60/758,911 to Campbell et al., filed Jan. 12, 2006, and of provisional patent application No. 60/830,541 to Mahajan et al., filed Jul. 12, 2006.

BACKGROUND OF THE INVENTION

1. Field of the Invention

This invention relates to fast, electro-optically switched zoom lens systems.

2. Description of the Related Art

To achieve zoom capability, conventional imaging systems generally utilize a lens component that must be mechanically moved to adjust the magnification of the image viewed. Mechanically moving a lens component in relation to other fixed lenses alters the focal length of the optical system, thereby altering the magnification of an image.

There are several disadvantages to using a mechanical system for zooming. The mechanical movement required to adjust the focal length, and hence magnification of a light source, requires space along its optical axis. Additional space is also required for the motors, gears and power supply that physically move the lens itself. Finally, space is needed for any potential user interface, such as a knob on a riflescope, that may be used to initiate the lens movement. Additionally, moving mechanical objects consumes excessive amount of power and time.

The use of mechanical zoom systems in applications lacking space or power supply—such as Unmanned Aerial Vehicles (UAVs), riflescopes and satellites-introduces significant inconvenience and operational cost. The motors, gears, guide track and other parts of a mechanical system add weight, which in turn increases cost and reduces the applications' operational range. Mechanical zoom systems also suffer from slow operation. The physical movement of the lens takes time, so that achieving the desired magnification incurs a delay. This delay can result in severe consequences in applications where timing is paramount, such as riflescopes and UAVs.

Mechanical zoom systems also cannot be used to zoom mid-wave infrared radiation ("IR") and beyond because the gears, motors and power supply radiate heat during operation, thereby interfering with IR detection. Finally, the repairs and adjustment required for a mechanical system, whose parts wear out over time, increases the downtime for any application in which it is used and thereby increases the costs of operating such a system.

An important requirement of many imaging systems with zoom capabilities is the reduction or elimination of optical aberrations, which blur and distort the image displayed. Optical aberrations of different types are caused by imperfect ray directing introduced by the system lens. In conventional single refractive lens systems, several known aberrations arise. Techniques for correcting these aberrations are well known. Birefringent lenses, on the other hand, produce a new aberration type, herein referred to as "birefringent aberration," because the crystal material out of which they are made results in an extra-ordinary refractive index that varies with a ray's propagation angle through the lens. This aberration manifests itself in a number of different ways, depending upon whether the ray is on-axis or off-axis. A technique for correcting this type of aberration is desirable, so that birefringent lenses can produce an unaberrated image when used in place of isotropic lenses.

The operation of zoom systems across broad temperature and spectral ranges would also be desirable for many applications. For example, zoom capabilities in the infrared spectral range would be beneficial for use by applications that operate at night.

It would also be desirable for a zoom lens system to be capable of switching between zoom states almost instantly, even at extreme operational temperatures.

Furthermore, the use of an imaging system with zoom capabilities in a targeting application (such as a riflescope, for example) requires a reticle to provide a visual cue that helps a user aim at a particular target. For these applications, it would be desirable to provide a reticle that is clearly visible in all zoom states.

U.S. Pat. No. 5,052,791 to Kikuchi discloses the use of lens elements having variable refractive powers (birefringent lens components) made of crystalline materials, coupled with a controller that changes the polarizing direction of light by 90 degrees through either a physical rotation or by an electrically driven twisted nematic liquid crystal layer.

U.S. Pat. No. 6,888,590 to Nishioka et al. discloses an optical element which is capable of varying an optical characteristic thereof using a polymer dispersive liquid crystal. The element can be used as a vari-focal lens element, a vari-focal diffractive optical element, a variable declination prism or the like.

U.S. Pat. No. 6,437,925 to Nishioka discloses an optical apparatus that includes an optical element for use in cameras, microscopes and the like, whose optical properties can be changed by applying an electric or magnetic field or temperature to a liquid crystal.

U.S. patent application Ser. No. 11/238,262 discloses a polarizer, affixed quarter wave-plate and free quarter wave-plate forming a rotation-invariant linear polarizer.

Although the above approaches eliminate mechanical movement and its associated problems, they do not adequately address providing broad spectral and thermal range operation, fast zooming, or displaying an in-focus reticle for all zoom states. U.S. Pat. No. 6,888,590 utilizes birefringent lenses, but fails to provide any technique for removing aberrations inherently caused by such lenses.

SUMMARY OF THE INVENTION

It is an object of the present invention as embodied in the claims to provide fast, electro-optically switched zoom lens systems, as well as birefringent aberration correction, and an in-focus reticle for all zoom states.

One aspect of the present invention provides a fast electro-optical zoom lens system that operates over a broad spectrum and broad temperature range. A polarizing controller sets the polarization state of light it transmits to a zoom lens system. The zoom lens system images the light to a magnification state that corresponds to its polarization state.

Another aspect provides a fast electro-optical polarization rotator system that operates over a broad spectrum and broad temperature range. A liquid crystal polarization rotator is activated and can also be heated nearly simultaneously to rapidly rotate the input light polarization state.

A reticle at each focal point preferably blocks polarized light of the polarization state at its focal point, and transmits the orthogonal polarization.

An optical masking system displays a mask pattern based on a polarization state of light.

Aberration correction is preferably provided in the zoom lens system with the use of birefringent compensating lenses and/or the use of tunable polarization filters.

Another aspect provides birefringent lenses that display an image for a select wavelength range based on a polarization state of input light.

DETAILED DESCRIPTION OF THE INVENTION

The present invention as embodied in the claims provides fast, electro-optically switched zoom lens systems, as well as birefringent aberration correction, and an in-focus reticle for all zoom states.

The term "quarter-wave plate" or "wave plate" as used herein refers to a wave plate that operates across a broad spectral range and is not limited to quarter-wave plates that operate only at a particular wavelength. Additionally, the term "lens" as used herein can mean a single lens, or several different lens elements that work together. "Activating" the liquid crystal includes changing the orientation of the liquid crystal's optical axis. "Electrode" and "conductor" are also interchangeable. Furthermore, the term "light" is not limited to the visible spectrum.

Figure 1A:
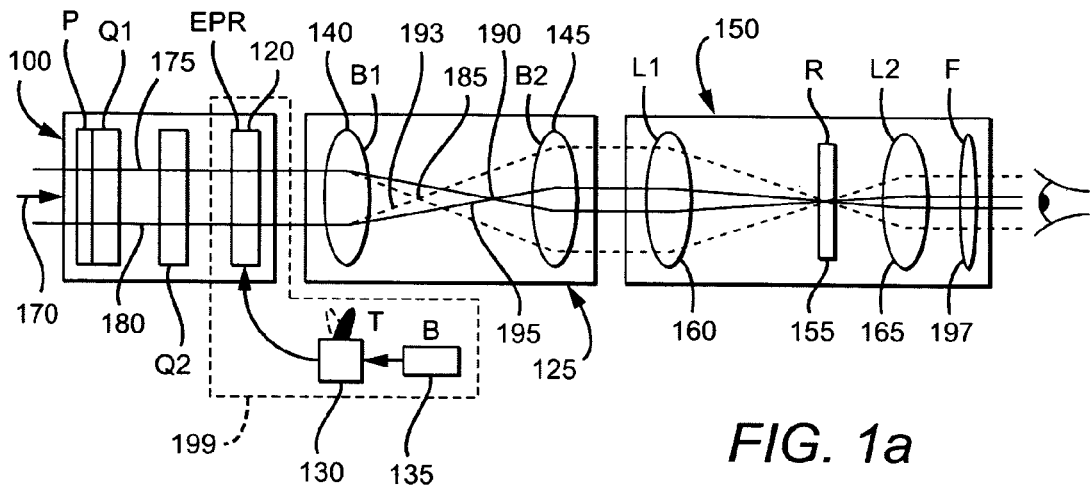
FIG. 1(a) is a schematic diagram illustrating one potential embodiment of an entire electro-optical zoom lens system in accordance with the invention.

FIG. 1(a) illustrates one embodiment of a full electro-optical zoom lens system that includes a polarizing controller 100 to control the polarization state of light and a zoom lens system 125 that magnifies light from the polarizing controller. This embodiment may be used in a riflescope or any targeting or other system that uses zoom capability.

The polarizing controller 100 is typically made of a first linear polarizer P that converts input light into linearly polarized light. A wave plate Q1 converts the linearly polarized light into circularly polarized light. A second wave plate Q2 linearly polarizes the light for input to an electro-optical polarization rotation system 199.

The electro-optical polarization rotation system 199 includes at least one polarization rotator 120 that rotates the polarization state of the input light when activated. A zoom lens system 125 that preferably comprises one or more birefringent lenses 140 and 145 refracts light from the polarization rotator to different zoom states corresponding to the light's polarization state. An optional lens system 150 can comprise a first lens element 160, reticle 155 and a second lens element 165 to provide isotropic magnification. FIG. 1(a) illustrates only one disposition of systems 100, 199 and 125. They may be arranged differently, stand alone, or be placed in a different system to produce similar effects described below.

Figure 1B:
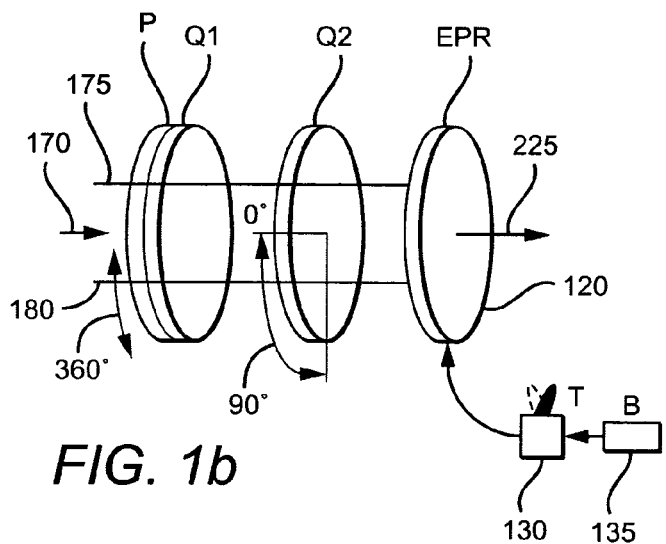
FIG. 1(b) is a schematic diagram illustrating a polarizer/rotator with mechanical backup that can be used in the polarization controller of the electro-optical zoom lens system.

One preferred embodiment of system 100 is illustrated in more detail in FIG. 1(b). The first linear polarizer P is physically coupled with wave plate Q1, which is preferably a quarter-wave plate, to allow for 360 degrees rotation of both to reduce glare and circularly polarize the incoming light 170, which is composed of rays 175 and 180. After passing through wave plate Q1, the light rays 175 and 180 then enter Q2, which is preferably a quarter-wave plate, although a linear polarizer may also be used.

If Q2 is a quarter wave plate, then Q2's optic axis is preferably mechanically set to either +45 degrees or −45 degrees with respect to the crystallographic axes of FIG. 1(a)'s lens elements 140 and 145. The emerging polarized light from Q2 is thus at either 0 or 90 degrees with respect to the crystallographic axes of lens elements 140 and 145 in FIG. 1(a). If Q2 is a linear polarizer, then Q2's axis is preferably mechanically set to either 0 degrees or 90 degrees with respect to the crystallographic axes of lens elements 140 and 145 in FIG. 1(a). However, in this architecture, an additional 50% of the input light will be lost. Q2 re-linearizes light rays 175 and 180 and can itself be physically rotated from 0 to 90 degrees, thereby selecting the polarization state of emerging light rays 175 and 180. This polarization state can be set by manually rotating Q2, thereby providing a mechanical backup to the electronic polarization rotator ("EPR"). Although manual rotation is preferred, other means for rotating are also possible.

Light rays 175 and 180 then enter the electro-optical polarization rotation system 199. This system preferably comprises at least one polarization rotator 120, and at least one control element 130 powered by battery 135. The polarization rotator rotates the incoming default polarization state by about 90 degrees when the control element 130 is activated. In this manner, the polarization rotator can time-multiplex the polarization state of the light it outputs. The polarization rotator can also spatially multiplex the output polarization state, although time-multiplexing is preferred. The control element may comprise a toggle switch or button or any other device that has at least two states. Multi-state control elements may also be used for systems with more than two zoom states. The control element can trigger the polarization rotator electrically, magnetically, or by any other means. Thus, through the activation of the control element, the polarization rotator can select a polarization state along either a fast or slow crystallographic axis of the lens element 140.

As depicted in FIG. 1(a), the polarized light rays 175 and 180 then enter zoom lens system 125, which preferably comprises at least one birefringent lens. A birefringent lens may comprise multiple lenses coupled together, and is not limited to a single lens. In one embodiment, zoom lens system 125 comprises two birefringent lens systems 140 and 145. Polarized light rays 175 and 180 preferably enter the first birefringent lens system 140, which has a short focal length 185 for light rays of one polarization state 193 and a long focal length 190 for light rays of the orthogonal polarization state 195. Preferably, birefringent field lenses that have large refractive power for one polarization state and small refractive power for the other polarization state are placed near locations 185 and 190 (not shown). The large refractive power for one polarization state controls and limits the lateral size of the system, while the small refractive power for the other polarization state improves image quality. Birefringent lens element 145 may have a long focal length for light rays of one polarization state 193 and a short focal length for light rays of the orthogonal polarization state 195. Light ray 195 diverges after focal point 190 and enters birefringent lens 145, which preferably redirects the light ray along the same axis as light ray 170 to form a first zoom state, and ray 193 diverges after focal point 185 and emerges from birefringent lens 145 to form a second zoom state. In one embodiment, the magnification of the resulting birefringent lens system will preferably be 0.5× for the first zoom state and 2× for the second zoom state. However, other magnification levels are possible.

Thus, the orientation of Q2 sets the default zoom level by selecting a polarization state that corresponds to the focal length of each lens for the desired zoom level. The zoom level can be switched to the non-default level by turning on the polarization rotator 120 to rotate the polarization state by 90 degrees. This rotation switches the polarization state transmitted and hence the zoom level. In the event the polarization rotator 120 does not work, Q2 can be manually rotated to switch between polarization states and thus zoom levels, thereby serving as a mechanical backup to the EPR.

An optional lens system 150 can include isotropic lens elements 160 and 165, which form a fixed 2× magnification telescope with reticle 155 located at the intermediate image plane. A focusing lens 197 allows for adjustment of a riflescope's focus. The combination of the 0.5× and 2× zoom factor of the birefringent lens system 125 and the isotropic lens system 150 results in a 1× and 4× zoom factor for the overall riflescope. Other zoom factors are possible using other isotropic lens combinations.

Q1 and Q2 illustrated in FIGS. 1(*a*) and 1(*b*) preferably comprise quarter-wave plates that operate over a broad spectral bandwidth and wide range of operational temperatures. The quarter-wave plates can comprise multiple layers of polymerized liquid crystal with substrate material between each layer for molecular alignment and mechanical ruggedness. Typically, a broadband wave plate has three or more layers of birefringent material oriented at appropriate angles. In one embodiment, the broad spectrum quarter-wave plate comprises four birefringent layers in which the middle two layers exhibit twice the retardation of the outer layers. The optic axes of the first three layers are preferably oriented at approximately 15 degree, 75 degree, and −60 degree with respect to optic axis of the fourth plate, although other arrangements are also possible. Other compositions and liquid crystal layering techniques yielding similar performance are also possible, including use of thin films. The wave plates preferably perform exceptionally well across a very broad spectral range of 400 nm-900 nm and beyond and across a very broad thermal range of −29 degrees Celsius to +49 degrees Celsius and beyond. For example, the quarter-wave plates preferably provide 99% polarization conversion between linear and circular states from approximately −30 degrees Celsius to approximately +50 degrees Celsius across the visible spectrum and beyond. Lesser polarization conversion is also possible and still desired where 99% conversion may not be possible. This conversion efficiency can extend into the 850 nm night vision band and beyond, especially at colder temperatures where night vision is more likely to be used.

The polarization rotator 120 illustrated in FIGS. 1(*a*) and 1(*b*) preferably operates over a broad spectral bandwidth and wide range of operational temperatures and electro-optically switches the polarization states in a short period of time. The polarization rotator preferably operates across the broad spectral range of 400 nm-900 nm and beyond and exhibits a response time of under 0.1 seconds in above-freezing temperatures and under 0.5 seconds down to −30 degrees Celsius. Response times slower than these are also possible and still desirable, especially if they are faster than mechanical zoom lens systems. To achieve these operating ranges, the polarization rotator preferably comprises 3-layers of 30-degree-twisted nematic liquid crystal with substrate material between each layer for molecular alignment and mechanical ruggedness. The number of liquid crystal/substrate layers and degree of twisting of the nematic liquid crystal can be varied to produce a different degree of rotation, faster response time, or different spectral response. Under this embodiment, the polarization rotator can provide 98.8% linear polarization rotation from −30 degrees Celsius to +50 degrees Celsius across the entire visible spectrum and beyond. Lower linear polarization rotation is still desirable if 98.8% is not possible. Additionally, good conversion continues into the 850 nm night vision band and beyond, especially at colder temperatures where night vision is more likely to be used.

Figure 2A:
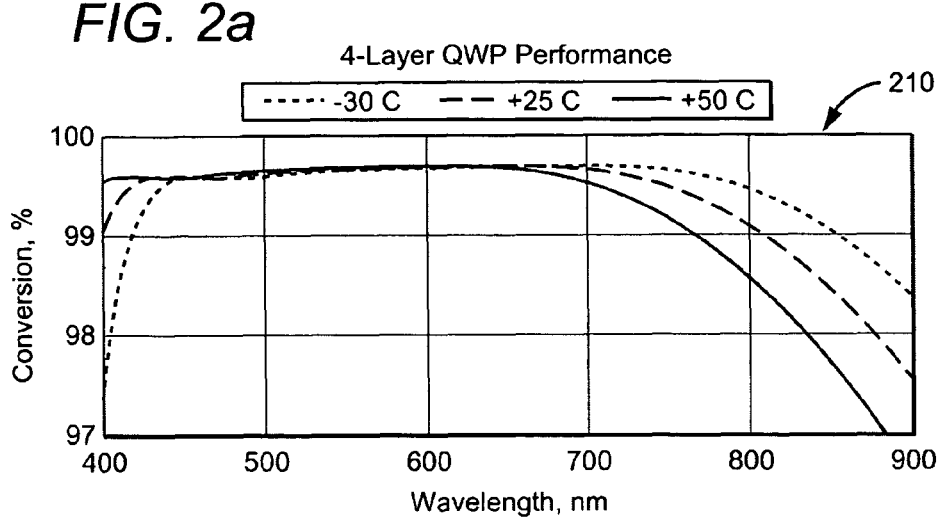
FIGS. 2(a), 2(b) and 2(c) are graphs illustrating the temperature dependence, the polarization rotation performance, and the response time of quarter-wave plates that can be used in one embodiment of the invention.
Figure 2B:
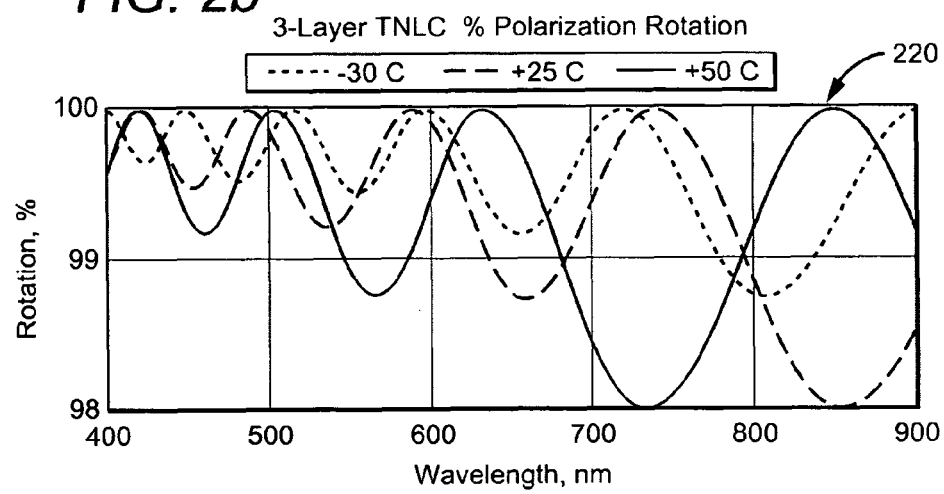
Figure 2C:
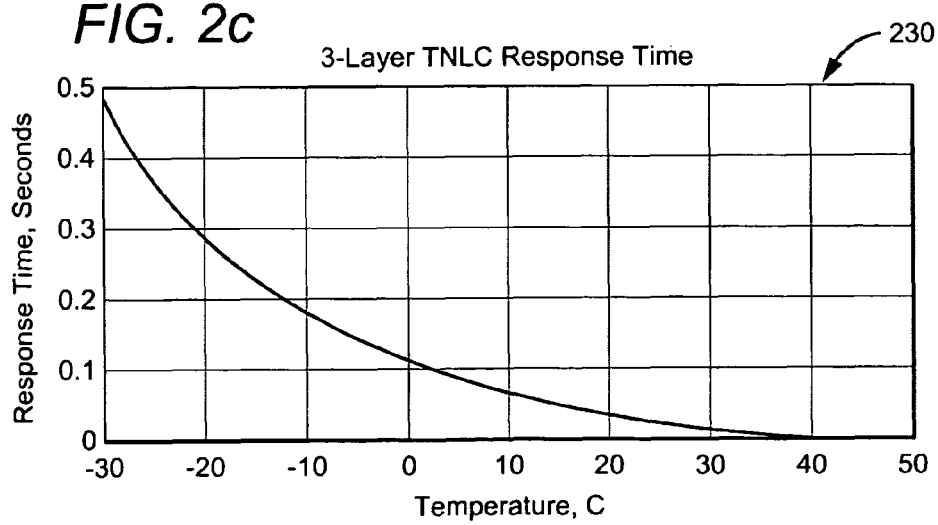

FIGS. 2(*a*), 2(*b*), and 2(*c*) illustrate a performance range for the broad spectrum, broad temperature quarter-wave plates and the polarization rotator. A four-layer quarter-wave plate's conversion percentage for temperatures ranging from −30 degrees Celsius to 50 degrees Celsius and for wavelengths from 400 nm to 900 nm is depicted in 210. A three-layer twisted nematic liquid crystal's rotation percentage for the same temperature range and wavelengths is depicted in 220, and its response time in seconds over temperatures ranging from −30 degrees Celsius to 50 degrees Celsius is shown in 230.

Figure 3:
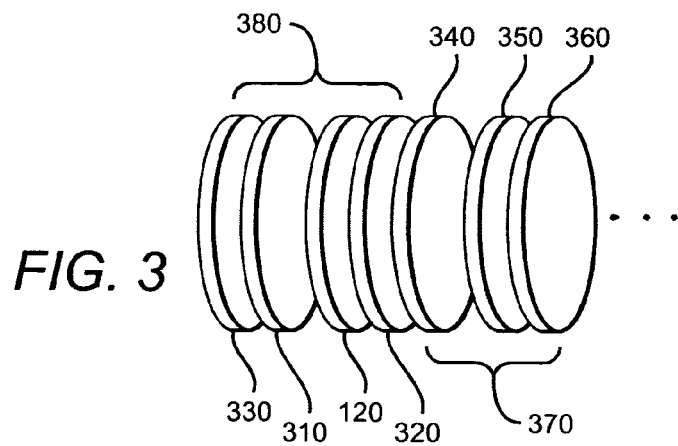
FIG. 3 is a perspective view illustrating a substrate, electrode, and liquid crystal cell used in one embodiment.
Figure 4:
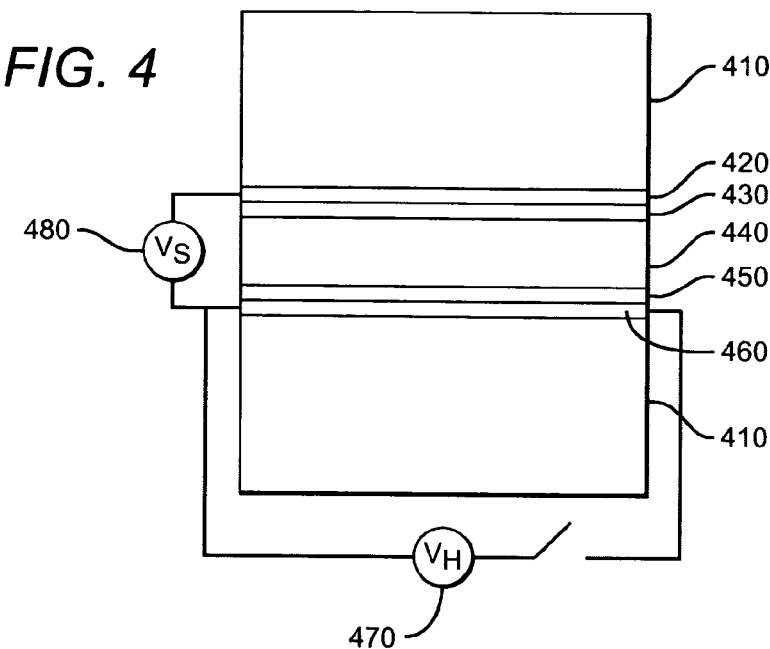
FIG. 4 is a perspective view illustrating one embodiment of a polarization rotator with separate heating and activating signals.

In another embodiment, the polarization rotator's temporal response can be further enhanced by heating a liquid crystal of the polarization rotator before or during the switching process, since the response time varies inversely with temperature. FIG. 3 illustrates one liquid crystal cell of a polarization rotator 120 preferably disposed between two preferably transparent electrodes 310 and 320 that are bound to substrates 330 and 340, as shown in 380. Alternatively, the liquid crystal cell 360 can also be placed adjacent to only one electrode 350 and substrate 340, as shown in 370. FIG. 4 illustrates one embodiment for applying heating and activating signals. A heating signal 470 applied across one transparent electrode 460 nearly instantly heats the liquid crystal layer 440, which may be adjacent to alignment layers 430 and 450. Nearly simultaneously, a change in activating signal 480 applied across electrodes 460 and 420 separated by the liquid crystal cell 440 initiates a rotation. Alternatively, the two electrodes 420 and 460 surrounding the liquid crystal cell can apply both the heating and activation signals simultaneously, or, in another embodiment, one of the two electrodes can apply the activation signal and the other the heating signal. Other combinations of liquid crystal cell, substrate and electrode are also possible. The heating signal is preferably applied prior to the change in the activating signal for a short duration of time. This "heat pulse" is preferably applied for the time it takes to cause a transient rise in temperature of the liquid crystal. The rotation preferably occurs during this transient rise in temperature of the liquid crystal layer, before heat spreads into the polarization rotator's substrate. This method is energy efficient and can use either a separate electrical source or the same battery source 135 as the switch depicted in FIG. 1(*a*).

Alternatively, the heating and the rotation activating signals applied can be distinguished by signal amplitude, signal duration, signal waveform, or some combination thereof. In any of these embodiments, the heating signal can be applied prior to the activating signal, or at the same time, although applying the heating signal just prior to the activating signal is preferred. Additionally, the control mechanism for triggering the heating and switching may be separate, although a single unit is preferred.

Figure 5A:
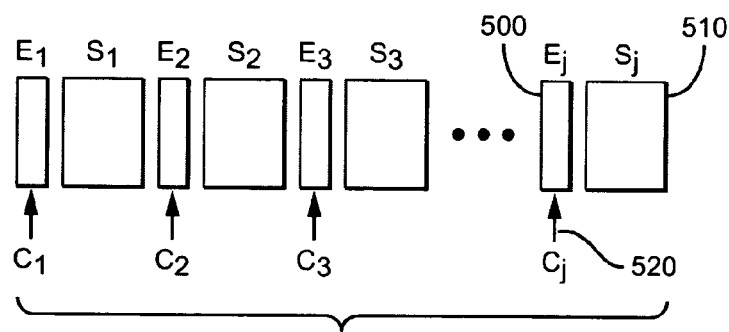
FIGS. 5(a) and 5(b) are schematic diagrams illustrating the concatenating/interleaving of several polarizing rotators, lens systems and controllers to create multiple zoom states.
Figure 5B:
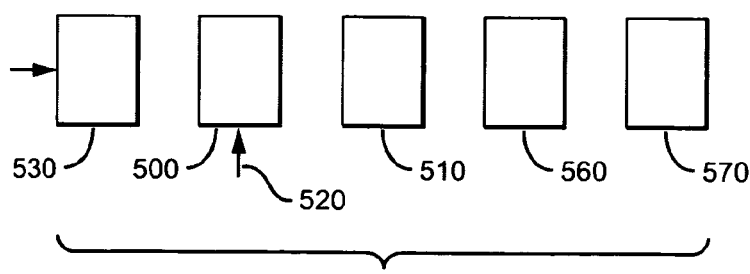

Another embodiment is depicted in FIGS. 5(*a*) and 5(*b*). This embodiment creates more than two zoom states by concatenating and/or interleaving multiple polarization rotators, control lines and lens systems. FIG. 5(*a*) shows one possible arrangement, where polarization rotator 500 is paired with zoom lens system 510 and control system 520. In this arrangement, J stages of polarization rotators and their associated lens systems and control systems enable $2^J$ possible zoom states. FIG. 5(*b*) shows another embodiment, where an electro-optical polarization rotator 560 is inserted between zoom lens systems 510 and 570, thereby providing more zoom level combinations. Without polarization rotator 560, 510's zoom level for one polarization state would only combine with 570's zoom level for the same polarization state. Adding polarization rotator 560 allows the user to rotate the polarization state before it enters 570. Thus, the user can match 510's zoom level for one polarization state with 570's zoom level for the orthogonal polarization state and obtain more combinations than without the polarization rotator.

Figure 6A:
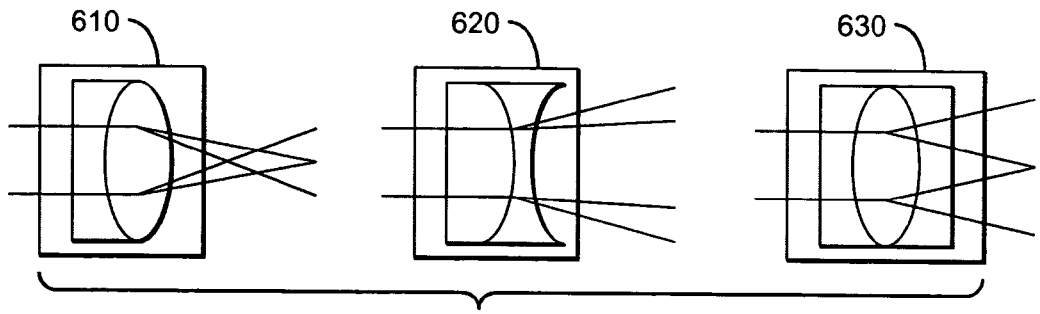
FIGS. 6(a), 6(b) and 6(c) are schematic diagrams illustrating various lens elements and their potential disposition in the lensing system.
Figure 6B:
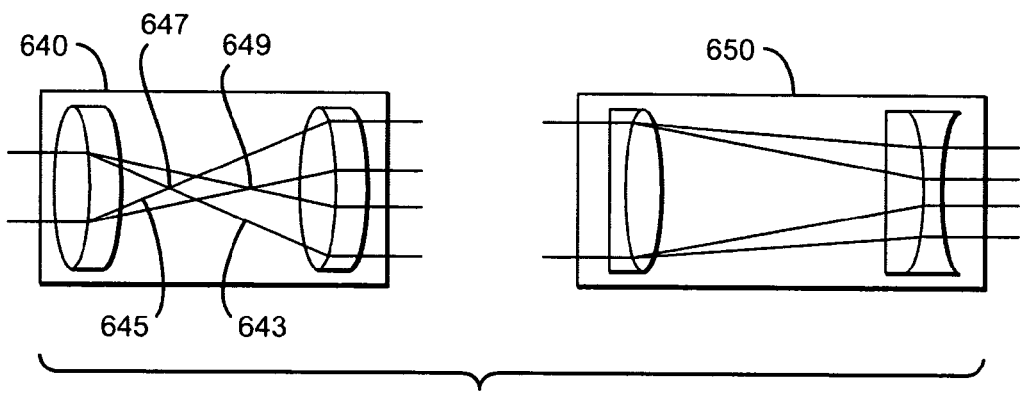
Figure 6C:
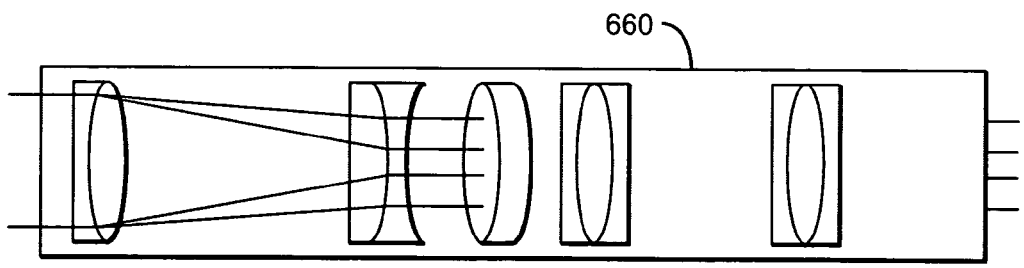

The lens system 510 may comprise a large variety of birefringent and/or isotropic forms and materials as depicted in FIGS. 6(*a*), 6(*b*), and 6(*c*). For example, the input polarization to the lenses can be used to select between one of two positive focal lengths shown in 610, one of two negative focal lengths illustrated in 620, and one of two positive and negative focal lengths as depicted in 630. These individual lenses can be combined to create telescopes depicted in 640, 650 and 660. Other telescopes are also possible with other arrangements and combinations.

Figure 7:
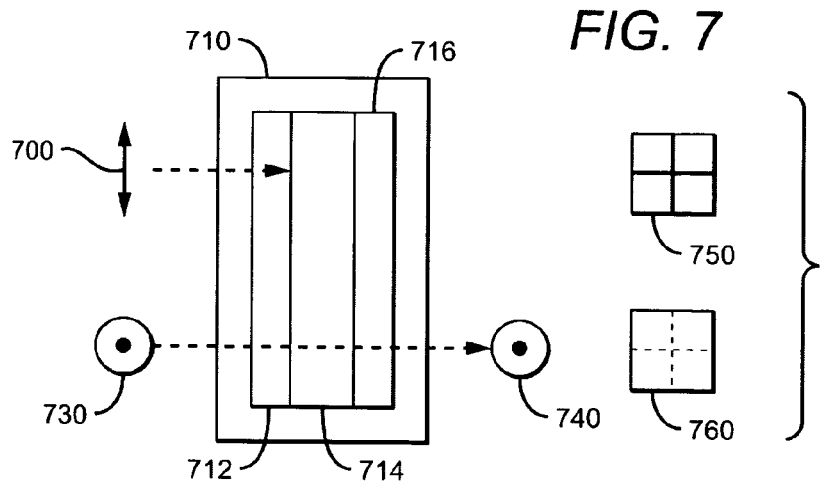
FIG. 7 is a schematic diagram illustrating a passive reticle that can be used in the system of FIG. 1.

Another embodiment provides possible combinations for the composition and placement of reticle(s) for targeting applications. For example, telescope 640 shown in FIG. 6(*b*) comprises birefringent lenses that create either focal point 647 or 649, depending on the polarization state that is selected. Each focal point represents a particular zoom state. The presence of two focal points introduces the problem of where to place the reticle, which should be visible and clear in all zoom states. One solution uses a reticle whose appearance varies based on the polarization state of light. This type of reticle preferably comprises a patterned birefringent material that displays only the reticle pattern for one polarization state, but is nearly invisible for the orthogonal polarization state. The reticle can be active or passive, although passive reticles are preferred. One reticle can be placed at focal point 647 and another at focal point 649. FIG. 7 illustrates the use of a passive polarizing reticle 710 that transmits light of one polarization while blocking light of the orthogonal polarization within the reticle pattern. Reticle 710 preferably comprises broad spectrum, broad temperature range quarter-wave plates 712 and 716, with a cholesteric circular polarizer 714 disposed in between. Other materials may also be used, although films that can be etched to create the desired reticle pattern are preferred. Light 700 of one polarized state is blocked by reticle element 710, thereby displaying a reticle pattern of 750. Light 730 of the orthogonal polarized state is transmitted through the other reticle located at the other focal point, thereby displaying no reticle pattern as depicted in 760. The effect of this passive reticle placement is to display the reticle only for the focal point corresponding to the selected zoom state.

Figure 8:
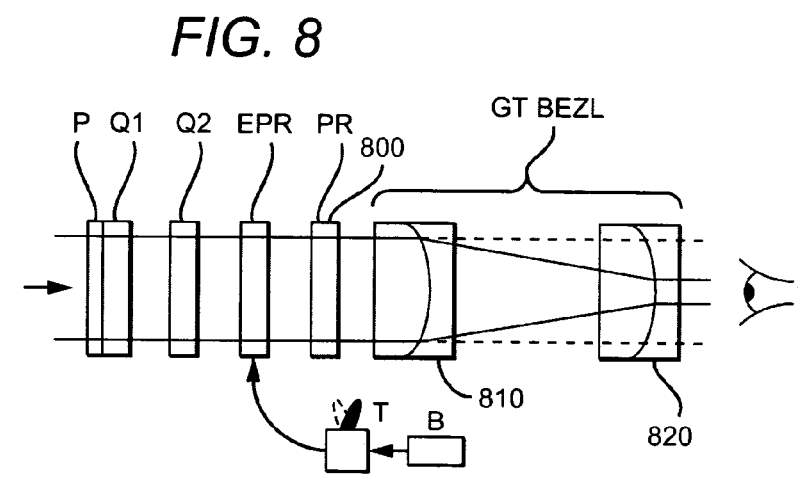
FIG. 8 is a schematic diagram illustrating a Gaussian telescope birefringent zoom lens architecture that uses a holographic reticle.

Alternatively, a reticle pattern can be illuminated using a polarized light source. Only the reticle pattern reflects light of the desired polarization state, while the remaining area surrounding the pattern transmits the polarized light, thereby displaying only the reticle pattern. The reticle may also be displayed by electrical or manual switching. Additionally, FIG. 8 illustrates the electro-optical zoom lens system operating with a holographic, projected reticle by polarizing its light for each polarization state, thereby displaying it clearly and the same size for all zoom states. Projected reticle 800 preferably appears in focus through the birefringent lenses 810 and 820 for any zoom state.

Figure 9:
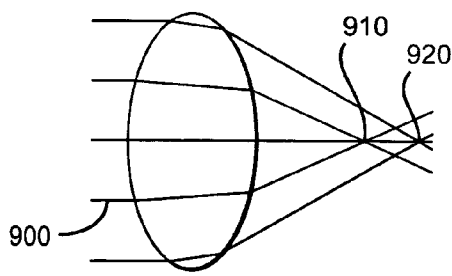
FIGS. 9 and 10 are schematic diagrams, respectively illustrating on-axis and off-axis aberrations that are corrected in one aspect of the invention.
Figure 10:
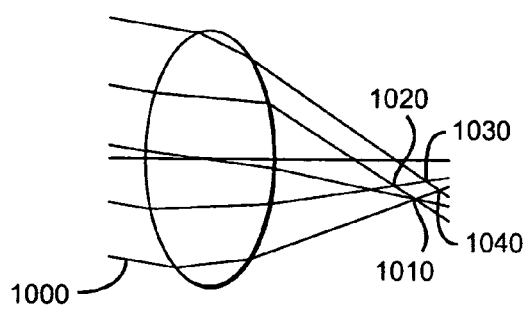
Figure 11:
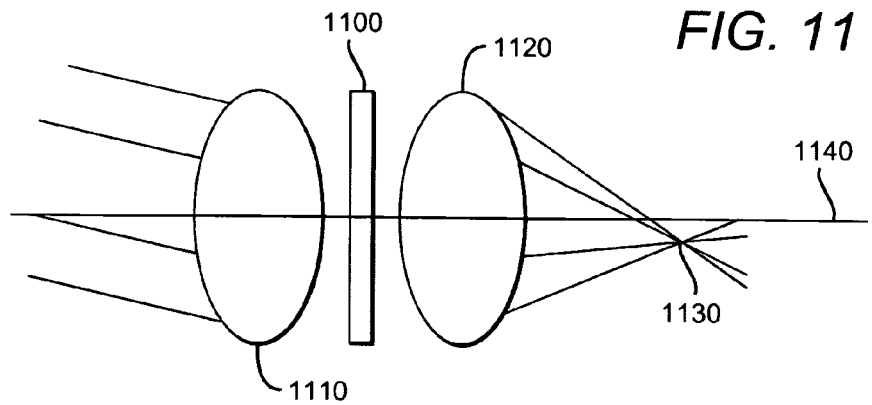
FIGS. 11, 12 and 13 are schematic diagrams illustrating the correction of aberrations by the insertion of a polarization rotator between two sections of a lens, by the use of materials that can have opposite signed birefringences, and by a tunable polarization filter, comprised of a first EPR, a linear polarizer and a second EPR.
Figure 12:
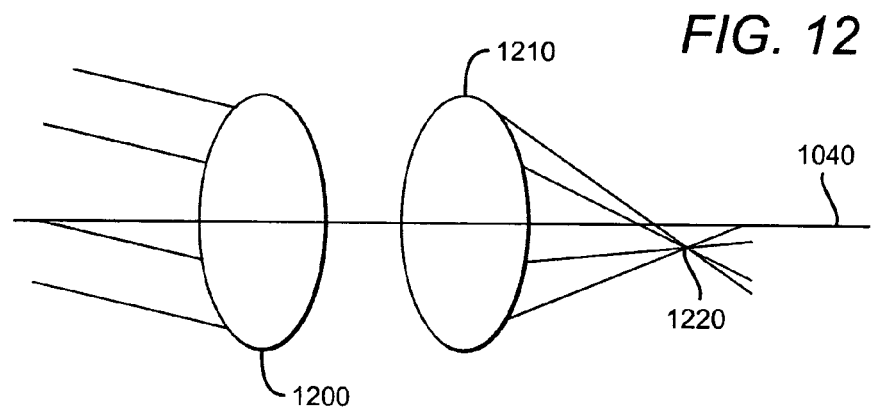
Figure 13:
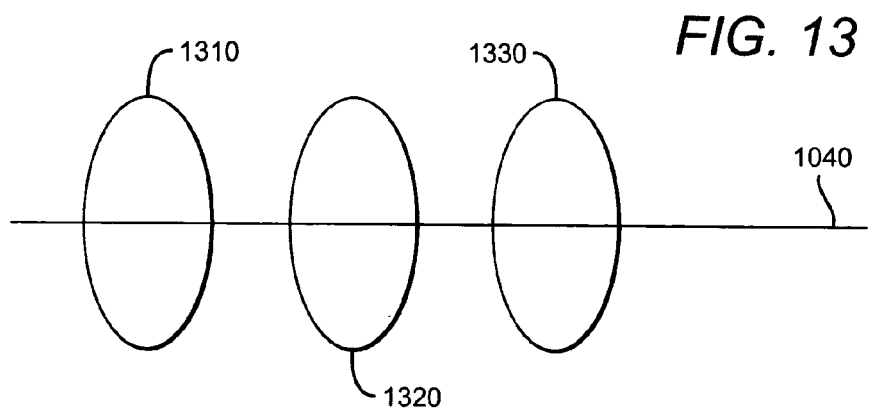

In another embodiment, birefringent lenses can be used for aberration correction. Aberrations occur in birefringent lenses because the lens crystal's extra-ordinary refractive index varies as a function of ray angle through the crystal. This variation based on ray angle can cause focusing errors, as well as other aberrations that differ from those caused by isotropic elements. FIG. 9 illustrates birefringent aberration caused by birefringent lenses for on-axis light rays 900 that produces aberration due to the creation of focal points 910 and 920. FIG. 10 illustrates birefringent aberration caused by skew "extra-ordinary" rays 1000, which create an astigmatic aberration due to multiple focal points 1010, 1020, 1030, and 1040. FIG. 11 illustrates one preferable technique to correct these aberrations. This technique utilizes at least one polarization rotator 1100 disposed between a first portion of a refractive material 1110 and a second portion of the refractive material 1120. The optic axis of the second portion of the refractive material is rotated 90 degrees with respect to the first portion of the refractive material, creating a single focal point 1130. This technique reduces birefringent aberrations, and one or more isotropic lens elements can be used to minimize residual aberrations. FIG. 12 illustrates another technique to correct birefringent aberrations. This technique utilizes at least two different materials 1200 and 1210 each having a specified birefringence of an opposite sign. The result is an improved focal point 1220. FIG. 13 illustrates an embodiment in which a polarizer 1320 is placed between activatable polarization rotators 1310 and 1330. This configuration may be placed in a birefringent zoom lens system to remove any undesirable polarization states caused by birefringent aberrations. In this approach, polarizer 1320 is preferably fixed (does not rotate), while the activatable polarization rotator 1310 aligns the incoming light's polarization to the axis of polarizer 1320, and polarization rotator 1330 re-aligns the outgoing polarization state to that of the incoming polarization state (if needed). Thus, this polarization filter corrects for birefringent aberration by extinguishing all rays of improper polarization.

Figure 14:
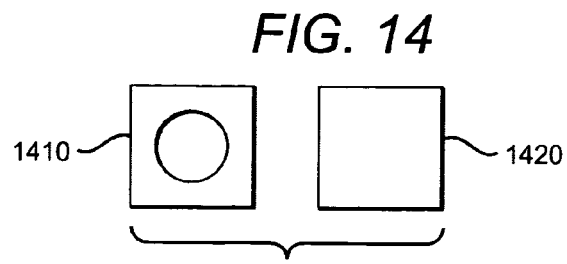
FIG. 14 is a schematic diagram illustrating a polarization dependent filter that acts as either a stop or a spatial filter for one polarization state.

FIG. 14 illustrates one embodiment of polarization dependent filter that acts as either a stop or a spatial filter for one polarization as shown in 1410, but is largely transmissive for the other polarization as shown in 1420. The polarization dependent stops or spatial filters are used to selectively filter out aberrant rays to improve image quality. These polarization dependent stops or filters can be passive or active but passive elements are preferred.

In another embodiment, the birefringent lens system is used to select over a single, large wavelength spectrum or over two distinct wavelength spectra. For one polarization state, the birefringent lens system produces optimum image quality over one wavelength spectrum and for the other polarization state, over different wavelength spectrum. The two wavelength spectra may be adjacent to each other or in discreet locations along the electromagnetic spectrum.

The aberration correction lenses in any of these embodiments may alternatively serve as field lenses for one polarization state and compensate for aberrations in the other polarization state.

While various implementations and embodiments of have been described, it will be apparent to those of ordinary skill in the art that many more are possible.

What is claimed is:

1. An electro-optical zoom lens system, comprising:
   a linear polarizer that receives input light and outputs linearly polarized light;
   a first wave plate positioned to receive said linearly polarized light and to output circularly polarized light;
   a second wave plate positioned to receive said circularly polarized light and to output linearly polarized light;
   a polarization rotator positioned to receive said linearly polarized light from said second wave plate, said polarization rotator being rotatable from a first position to a second position when activated and arranged such that it transmits linearly polarized light having a first polarization state when in said first position and transmits linearly polarized light having a second polarization state which is orthogonal to said first polarization state when in said second position; and
   a zoom lens system positioned to receive said linearly polarized light from said polarization rotator and arranged to magnify said light to a first power when said light has said first polarization state and to a second power different from said first power when said light has said second polarization state.

2. The system of claim 1, wherein each said first and second wave plates comprises a plurality of liquid crystal layers in series.

3. The system of claim 1, wherein said electro-optical polarization rotator system further comprises:
   a controller connected to activate said polarization rotator in response to a polarization activation command.

4. The system of claim 3, wherein said polarization rotator comprises a plurality of liquid crystal cells in series, each cell comprising liquid crystal and separated from an adjacent cell by at least one substrate, said polarization rotator activated by applying an activating signal to the liquid crystal within at least one of said liquid crystal cells.

5. The system of claim 4, wherein said controller is capable of nearly simultaneously activating and heating the liquid crystal within a liquid crystal cell of said polarization rotator.

6. The system of claim 4, wherein each of said substrates is bounded by electrodes across which an activating signal can be applied to activate said polarization rotator, said electrodes having sufficient resistance to heat said liquid crystal in response to a heating signal from said controller.

7. The system of claim 6, wherein said activating signal comprises an activating signal amplitude and said heating signal comprises a heating signal amplitude.

8. The system of claim 6, wherein said activating signal comprises an activating waveform and said heating signal comprises a heating waveform.

9. The system of claim 1, wherein said zoom lens system comprises a plurality of lens elements that correct for birefringent aberrations.

10. The lens system of claim 9, wherein said plurality of lens elements comprises a birefringent lens with at least two different materials having orthogonally oriented optic axes.

11. The lens system of claim 9, wherein said plurality of lens elements comprises at least one polarization rotator disposed between a first and second portion of a birefringent refractive material.

12. The lens system of claim 11, wherein said second portion has an optical axis rotated by nearly 90 degrees with respect to said first portion.

13. The lens system of claim 9, wherein said plurality of lens elements comprises a polarizer that transmits only light of a desired polarization state disposed between a first and second polarization rotator that can be activated to rotate the polarization state of the light.

14. The lens system of claim 9, wherein said plurality of lens elements comprise birefringent lenses that provide no or very little refraction in a first polarization state and operate as field lenses in second polarization state.

15. The lens system of claim 9, wherein said plurality of lens elements correct aberrations in one polarization state and operate as field lenses in another polarization state.

16. The system of claim 1, wherein said zoom lens system comprises a polarization rotator disposed between at least one pair of birefringent lenses to allow multiple zoom level combinations.

17. A lens system, comprising a plurality of broadband, birefringent lenses that display an image for a selected wavelength range based on a polarization state of input light.

* * * * *